United States Patent [19]

Tackikawa et al.

[11] Patent Number: 4,871,558
[45] Date of Patent: * Oct. 3, 1989

[54] OIL OR FAT COATED SUBSTANCE AND METHOD OF MAKING THE SAME

[75] Inventors: Toru Tackikawa; Yoshihiko Fuseya, both of Kawasaki, Japan

[73] Assignee: Ajinomoto Co., Inc., Tokyo, Japan

[*] Notice: The portion of the term of this patent subsequent to Jun. 28, 2005 has been disclaimed.

[21] Appl. No.: 191,803

[22] Filed: May 9, 1988

Related U.S. Application Data

[63] Continuation of Ser. No. 18,529, Feb. 25, 1987, abandoned.

[30] Foreign Application Priority Data

Mar. 17, 1986 [JP] Japan .................................. 61-59008

[51] Int. Cl.$^4$ .............................................. A23L 1/229
[52] U.S. Cl. ........................................ 426/99; 426/96; 426/307
[58] Field of Search .................... 426/308, 99, 96, 307

[56] References Cited

U.S. PATENT DOCUMENTS

| | | | |
|---|---|---|---|
| 1,985,846 | 12/1934 | Trowbridge | 426/308 |
| 3,196,018 | 7/1965 | Galler | 426/96 X |
| 3,359,120 | 12/1967 | Meusel et al. | 426/92 X |
| 3,856,699 | 12/1974 | Miyano et al. | 426/99 X |
| 4,267,198 | 5/1981 | Sato et al. | 426/99 X |
| 4,511,584 | 4/1985 | Percel et al. | 426/99 |
| 4,753,807 | 6/1988 | Fuseya et al. | 426/99 |

FOREIGN PATENT DOCUMENTS 0154514  12/1979  Japan .................................... 426/99

OTHER PUBLICATIONS

JPO Abstracts, abstracting 61-177966, Kaneko et al (Ajinomoto Co.), Abstract Publication Date-Dec. 26, 1986.

*Primary Examiner*—Joseph Golian
*Attorney, Agent, or Firm*—Oblon, Spivak, McClelland, Maier & Neustadt

[57] ABSTRACT

The invention relates to an oil or fat coated substance comprising a core material coated with a mixture comprising a solid fat and an edible wax.

6 Claims, No Drawings

OIL OR FAT COATED SUBSTANCE AND METHOD OF MAKING THE SAME

This application is a continuation of application Ser. No. 07/018,529, filed on Feb. 25, 1987, now abandoned.

BACKGROUND OF THE INVENTION

1. Field of the Invention

This invention relates to a substance comprising a core coated in a waterproof fashion with a film-forming agent which melts when it is heated. More particularly, it relates to an oil or fat coated substance comprising a core and a coating film which does not break or melt at ordinary room temperatures when placed in, for example, food containing water during its manufacturing process which may include cutting, and which melts and thereby allows the core to dissolve in water when it is heated to a high temperature.

2. Discussion of the Background

There are known coated additives for food which comprise cores coated with substances which melt only when they are heated. The cores are, for example, organic acids which are added to boiled fish paste ("kamaboko" in Japanese), sausages, etc. to lower their pH, or 5'-ribonucleotides. The films with which the cores are coated do not melt at ordinary room temperatures and thereby prevent the destruction of the cores by the enzymes which the food contains. The enzymes lose their activity when they are heated.

The temperature to which they are heated depends on the food to which they are added, and has a wide range of from about 50° C. to 90° C. In order to form appropriate films in view of these temperatures, there have been used oils or fats, waxes, solid surface active agents (e.g. monoglyceride and sorbitan ester) or other substances that are waterproof and can prevent the dissolution of the cores into food. When the temperature is from 65° C. to 85° C., carnauba wax and rice wax, which are edible waxes and have a low melting point, have been used. The waxes, however, have a number of drawbacks. They are more expensive than oils and fats. If a large number of wax is used, it separates from the ingredients of food when the molten wax is cooled and the separated wax degrades the appearance of the food or makes it unpleasant to the taste.

Even if grains of additives coated with strong films can be obtained, the films are broken during various stages of a food manufacturing process, for example, when the raw materials are cut or ground or kneaded to manufacture sausages or fish-paste products. As a result, the core substances are dissolved prior to treatment at a high temperature.

SUMMARY OF THE INVENTION

Accordingly, one object of the present invention is to provide a coated substance comprising a core material coated with a film which resists breakage or melting during manufacturing.

Another object of the invention is to provide a coated substance in which the film contains a wax and yet does not degrade the appearance of food or make it unpleasant to the taste.

A further object of the invention is to provide a coated substance which when heated releases the core material.

These objects and other objects of the present invention have been achieved by the oil or fat coated substance of the present invention which comprises:

A core material coated with a film, said film comprising a mixture of a solid fat and an edible wax.

DETAILED DESCRIPTION OF THE PREFERRED EMBODIMENTS

A study has been conducted regarding the possibility of mixing a hardened oil or fat with a wax having a high melting point to obtain a film-forming agent having a satisfactory high melting point. We have tried to determine numerically any possible change in the melting point of a solid solution formed by the two components and study its melting characteristics which occur when the food containing it is heated, considering that a mixture of a high-melting wax and 50 to 60% by weight of a hardened oil or fat would have a melting point which is only about 2° C. or 3° C. lower than that of the wax, and that a mixture containing a greater percentage of hardened oil or fat would have a melting point between the melting points of the wax and the oil or fat.

Contrary to our expectations, however, we have found that a mixture having a theoretical melting point which is 8° C. lower than that of the wax which it contains does not melt at this melting point, but rather does not melt until it is heated to the melting point of the wax, and that even a mixture containing a large amount of hardened oil or fat can maintain a melting point close to that of the wax which it contains.

When the raw material containing coated additive particles is cut during the manufacture of, for example, sausages, the particles are likely to be partly broken. This tendency becomes greater with an increase in the lard or other fat content of the raw material or with a rise in the temperature to which meat is heated during the manufacture of sausages. If the coated particles are coated with a mixture of a solid oil or fat and a wax, however, no increase in the fat content of the raw material is likely to cause the breakage of the particles leading to the release or loss of the core substance.

According to this invention, there is no particular limitation to the core substance which can be coated. However, it is mainly selected from the food additives including antibacterial agents such as sorbic acid, pH controllers such as fumaric acid, seasonings such as 5'-ribonucleotide and the mixtures thereof.

The coating agent comprises a wax, which is used for obtaining a high melting point, and a solid fat, which is used as a diluent. While rice wax is a preferred wax, it is also possible to use, for example, carnauba wax, candelilla wax or beeswax. The solid fat may be extremely hardened beef tallow, hardened rapeseed oil or any other hardened oil, or any solid fat having a melting point of 50° C. to 70° C.

When the coating agent is applied to the core, it is melted under heat, the core substance is admixed with the molten coating agent and the molten material is cooled for solidification. The cooling and solidification thereof can be carried out by a known method which relies upon, for example, dropping into cold water or spraying.

If the coating agent has too low a wax content, the coated particles begin to be dissolved at too low a temperature when they are heated, and have too low a degree of cutting resistance. Therefore, it is important to use at least 2, or preferably 5, parts of wax for 100 parts of solid fat, while the upper limit which produces significant effects is 50 parts. A more preferable range is from 5 to 20 parts of wax for 100 parts of solid fat, as it enables the optimum results from the standpoints of both cutting resistance and dissolution temperature.

The dissolution of the substances under heat can be determined if they are heated in water at various temperatures.

The temperatures at which the coating material melts exceeds its theoretical melting point and reaches the melting point of the wax which it contains. While not being limited to a particular theory, this is presumably due to the fact that if the temperature exceeds the melting point of the oil or fat, it is separated from the wax and the coating film remaining on the core consists mainly of the wax alone.

This phenomenon can be utilized to produce a substance coated with a film consisting mainly of wax if the oil or fat is separated therefrom by heating in water.

According to this invention, the combination of a solid fat and a wax, of which the amount of wax is not larger than one half that of the fat, enables the formation of a coating film which is satisfactory in appearance, hardness, etc., shows a high degree of breaking strength during various stages of a manufacturing process and has a high melting point which is comparable to that of wax. It can be used for coating additives to various kinds of food or medicine, or the like to protect the additives until heating at a high temperature.

Other features of the invention will become apparent in the course of the following descriptions of exemplary embodiments which are given for illustration of the invention and are not intended to be limiting thereof.

EXAMPLES

Various kinds of coated particles were prepared by coating sodium 5'-inosinate ("IN") with coating agents containing different proportions of different solid fats and waxes as shown in TABLE 1 and spray cooling the coated material.

Each kind of coated particles was used for manufacturing Vienna sausages from the raw materials listed below by the following method.

Raw Materials for Vienna Sausages

TABLE 1

| Crural meat of hog | 1500 g |
| Lard | 1000 g |
| Ice | 1000 g |

TABLE 1-continued

| Potato starch | 200 g |
| NaCl | 75 g |
| Phosphate | 10 g |
| Spice and other additives | 50 g |
| Coated "IN" particles | 20 g |

"IN": Sodium 5'-inosinate (product of Ajinomoto K.K.)

METHOD OF MANUFACTURING VIENNA SAUSAGES

Minced crural meat of hog, lard, NaCl and phosphate were cut for two minutes in a silent cutter. After ice had been added, the cutter was operated for two more minutes. Then, the other materials, except the coated "IN" particles, were added and the cutter was operated for two more minutes. The coated "IN" particles were then added and the cutter was operated for three more minutes. The raw materials were put in casings of sheep intestine and were dried, smoked and heated in a smoking chamber. Then, they were cooled to yield Vienna sausages.

PHYSICAL PROPERTIES OF COATED "IN" PARTICLES

The melting point, grain size and compressive strength of each kind of coated particles were examined. They were also examined for the percentage of dissolution 0.5 and 2.5 hours after they had been added to the raw materials, and for the percentage of the particles which were found to remain after cutting. The results are shown in TABLE 2. The percentage of the remaining particles which had been coated with only a hardened oil or fat showed an increase only with an increase in compressive strength. On the other hand, the percentage of the remaining particles coated with a mixture of a hardened oil or fat and a was showed a remarkable increase despite their lower compressive strength.

Although the particles coated with only a hardened oil or fat are likely to break if the raw materials contain a large amount of lard, the particles coated with a film further containing wax do not break easily, even if the amount of lard is as much as 50% that of meat. Although the particles coated with only a hardened oil or fat are easily broken if the temperature of the meat exceeds 10° C., the particles coated with a mixture further containing wax

TABLE 2

| Oil or fat | Extremely hardened beef tallow | | | | | | | | |
|---|---|---|---|---|---|---|---|---|---|
| Wax | Not added | | | | Rice wax | | | Carnauba wax | |
| Amount of wax (% of oil or fat) | 0 | 0 | 0 | 0 | 7.5 | 10.0 | 15.0 | 4.0 | 6.0 |
| Sp—Cl particles* | | | | | | | | | |
| Melting point (°C.) | 60 | 60 | 60 | 60 | 65 | 66 | 68 | 67 | 70 |
| Grain size (μm) | 250 −297 | 350 −420 | 500 −590 | 590 −710 | 350 −420 | 350 −420 | 350 −420 | 350 −420 | 350 −420 |
| Compressive strength (G) | 9 | 16 | 23 | 29 | 12 | 12 | 14 | 14 | 10 |
| % of Sp—Cl particles remaining after cutting | 6 | 21 | 71 | 51 | 89 | 93 | 96 | 55 | 68 |
| Oil or fat | Extremely hardened beef tallow | | Hardened rapeseed oil | |
| Wax | Candelilla wax | | Not added | Rice wax |
| Amount of wax (% of | 7.5 | | 0 | 7.5 |

TABLE 2-continued

| | | | |
|---|---|---|---|
| oil or fat) Sp—Cl particles* | | | |
| Melting point (°C.) | 60 | 68 | 68 |
| Grain size (μm) | 350–420 | 350–420 | 350–420 |
| Compressive strength (G) | 12 | 15 | 13 |
| % of Sp—Cl particles remaining after cutting | 77 | 37 | 70 |

*Particles prepared by spray cooling are not easily broken when the raw materials are cut, even if the meat may have a somewhat higher temperature.

EXAMPLE 1

A hundred parts of extremely hardened beef tallow having a melting point of 60° C. were added to six parts of carnauba wax having a melting point of 82° C. They were melted under heat to form a solution having a temperature of 90° C. Thirty-five parts of fine sodium 5'-inosinate powder were dispersed in the solution. The dispersion was cooled by spraying to prepare coated particles having a size of 177 to 590 microns.

The coated particles had a melting point of 64° C. They were then examined for percentage of dissolution in water. A half gram of coated particles was placed in 100 g of water and left at a standstill for 30 minutes. The amount of the sodium 5'-inosinate which had been dissolved in the water was compared with the original amount.

Percentage of Dissolution in Water

| Water temp. | 55° C. | 60° C. | 65° C. | 75° C. | 79° C. | 83° C. |
|---|---|---|---|---|---|---|
| Dissolution | 7% | 6% | 7% | 10% | 32% | 99% |

The dissolution of the particles could be kept at a satisfactorily low level until the water temperature approached the melting point of the wax which was far higher than that of the coated materials.

EXAMPLE 2

A hundred parts of hardened palm oil having a melting point of 56° C. were added to 30 parts of rice wax having a melting point of 75° C. They were melted to form a solution. Forty parts of dl-methionine were added to the solution. It was dropped onto a cooling belt for solidification to form coated particles having a size of 1.19 to 2.00 mm. The particles had a melting point of 67° C. The following table shows the percentage of their dissolution in water. Their dissolution could be substantially prevented until the melting point of the rice wax was reached.

Percentage of Dissolution in Water

| Water temp. | 40° C. | 57° C. | 67° C. | 73° C. | 76° C. |
|---|---|---|---|---|---|
| Dissolution | 2% | 8% | 6% | 13% | 100% |

The particles which had been tested for dissolution in the water having a temperature of 73° C. were removed from the water and dried. They had a melting point of 75° C. They were heated for another dissolution test. The cores of the particles began to melt as soon as they were heated to 75° C.

EXAMPLE 3

Rice wax having a melting point of 78° C. was added to extremely hardened beef tallow having a melting point of 60° C. They were melted under heat to form a solution. Thirty parts of fine sodium 5'-inosinate powder were dispersed in 70 parts of the solution. The dispersion was cooled by spraying to form coated particles having a size of 350 to 710 μm. For comparison purposes, coated particles having a size of 350 to 710 μm were prepared by adding 30 parts of fine sodium 5'-inosinate powder to a solution which had been prepared by melting 70 parts of the hardened beef tallow. The seasoning particles of this invention and the comparative particles which had been obtained were used for manufacturing Vienna sausages from the raw materials and method as described above. Samples were taken from the materials after cutting during the manufacture of sausages and the precentage of the particles remaining without breaking was examined. The results are shown in TABLE 3.

TABLE 3

| Amount of rice wax (% of tallow) | 0 | 1 | 2 | 5 | 10 | 20 | 50 |
|---|---|---|---|---|---|---|---|
| % of particles remaining after cutting | 60 | 62 | 68 | 75 | 93 | 97 | 97 |

The results indicate that the coated particles are not easily broken if the coating material contains at least 2% of rice wax and especially if it contains at least 5% of rice wax. Although the percentage of the remaining particles increases with an increase in the amount of the wax, it ceases to increase if the amount of the wax exceeds 20%. It is, therefore, apparent that, while 50% is the upper limit which makes the addition of the wax significant, it is preferable to add the wax in an amount not exceeding 20%. The Vienna sausages which had been manufactured were examined with respect to the percentage of the sodium 5'-inosinate (IMP) remaining therein. The results are shown in TABLE 4.

TABLE 4

| Amount of rice wax (% of tallow) | 0 | 5 | 10 |
|---|---|---|---|
| % of IMP remaining | 56 | 81 | 86 |

TABLE 4-continued in sausages

It is obvious from the table that the addition of rice wax improved the stability of IMP in the sausages.

EXAMPLE 4

Seven and a half parts of wax were added to 90 parts of extremely hardened beef tallow having a melting point of 60° C. Various kinds of wax were employed. Fine sodium 5'-inosinate powder was added to prepare coated particles having a size of 350 to 710 μm in accordance with the procedure described in Example 1. Coated particles were also prepared without using any wax for comparison purposes. The coated particles were used for manufacturing Vienna sausages from the raw materials as described above. Samples were taken after cutting and the percentage of the coated particles remaining without breaking during the manufacture of sausages was examined. The results are given in Table 5.

TABLE 5

| Wax added | None | Rice wax | Carnauba wax | Candelilla wax |
|---|---|---|---|---|
| % of particles remaining after cutting | 51 | 89 | 68 | 77 |

The results confirm that the addition of the wax is effective. While rice wax is the most preferable wax, the other waxes are also satisfactorily effective.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A coated substance, comprising:
 a core material coated with a film comprising a mixture of a solid fat having a melting point between 50°-70° C. and an edible wax having a melting point between 65°-85° C., wherein said core material is a 5'-ribonucleotide, and wherein said film comprises about 2-50 parts by weight of said edible wax per 100 parts by weight of said solid fat.

2. The coated substance of claim 1, wherein said edible wax is rice wax, carnauba wax, candelilla wax or bees wax.

3. The coated substance of claim 1, wherein said solid fat is hardened beef tallow or a hardened oil.

4. The coated substance of claim 3, wherein said hardened oil is hardened rapeseed oil.

5. A method of preparing a coated substance comprising the step of:
 coating a core material with a molten mixture comprised of a solid fat having a melting point between 50°-70° C. and an edible wax having a melting point between 65°-85° C. and
 cooling and solidifying said molten coating, wherein said core material is a 5'-ribonucleotide, and wherein said film comprises about 2-50 parts by weight of said edible wax per 100 parts by weight of said solid fat.

6. The method of claim 5, wherein said cooling step is performed by dropping into cooled water or spraying.

* * * * *

UNITED STATES PATENT AND TRADEMARK OFFICE
CERTIFICATE OF CORRECTION

PATENT NO. : 4,871,558
DATED : Oct. 3, 1989
INVENTOR(S) : Toru Tachikawa, et al

It is certified that error appears in the above-identified patent and that said Letters Patent is hereby corrected as shown below:

On the title page:
The first inventor's name is incorrectly recorded, "Toru Tackikawa", should be:

--Toru Tachikawa--

Signed and Sealed this

Twelfth Day of February, 1991

*Attest:*

HARRY F. MANBECK, JR.

*Attesting Officer*　　　　*Commissioner of Patents and Trademarks*